Figure 3:
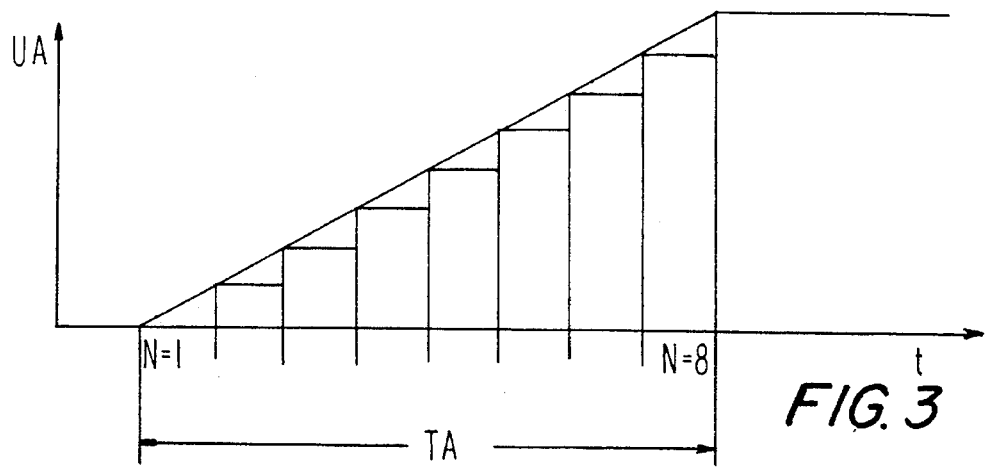

United States Patent [19]
Ohms et al.

[11] Patent Number: 5,568,369
[45] Date of Patent: Oct. 22, 1996

[54] METHOD FOR OPERATING A VOLTAGE CONVERTER, AND A VOLTAGE CONVERTER AND ITS APPLICATION

[75] Inventors: Franz Ohms, Oberrot; Martin Geiler, Elzach, both of Germany

[73] Assignee: Ant Nachrichtentechnik GmbH, Backnang, Germany

[21] Appl. No.: 424,342

[22] PCT Filed: Oct. 4, 1993

[86] PCT No.: PCT/DE93/00928

§ 371 Date: Apr. 17, 1995

§ 102(e) Date: Apr. 17, 1995

[87] PCT Pub. No.: WO94/09556

PCT Pub. Date: Apr. 28, 1994

[30] Foreign Application Priority Data

Oct. 15, 1992 [DE] Germany ............................ 43 34 772.6

[51] Int. Cl.$^6$ ........................... H02M 3/335; H02M 3/24; H02M 7/00
[52] U.S. Cl. ................. 363/26; 363/97; 363/124
[58] Field of Search .................. 363/24, 25, 26, 363/41, 97, 124

[56] References Cited

U.S. PATENT DOCUMENTS

| | | | |
|---|---|---|---|
| 4,797,803 | 1/1989 | Carroll | 363/95 |
| 4,823,249 | 4/1989 | Garcia, II | 363/48 |
| 5,053,937 | 10/1991 | Blöekl | 363/16 |
| 5,095,416 | 3/1992 | Ohms | 363/97 |
| 5,113,334 | 5/1992 | Tuson et al. | 363/25 |
| 5,438,500 | 8/1995 | Ohms | 363/24 |

Primary Examiner—Peter S. Wong
Assistant Examiner—Bao Q. Vu
Attorney, Agent, or Firm—Michaeel J. Striker

[57] ABSTRACT

In a voltage converter for switching mode, for example a push-pull voltage converter (GW), during a starting operation the switching-on pulses for the switching elements (S1, S2) are dimensioned to be of different length, specifically in such a way that the mean value of the energy-consuming current does not exceed a prescribed limiting value.

By contrast with conventional methods, there is no regulation of the switching-on pulses, but the different switching-on times in a plurality of subphases are prescribed in a fixed fashion as a function of the inductance (LS) of the DC/DC voltage converter (GW).

The method according to the invention ensures that the mean value of the inrush current cannot become substantially higher than a prescribed nominal value. This is advantageous, in particular, for the power supply of travelling wave amplifiers. FIG. 1

7 Claims, 4 Drawing Sheets

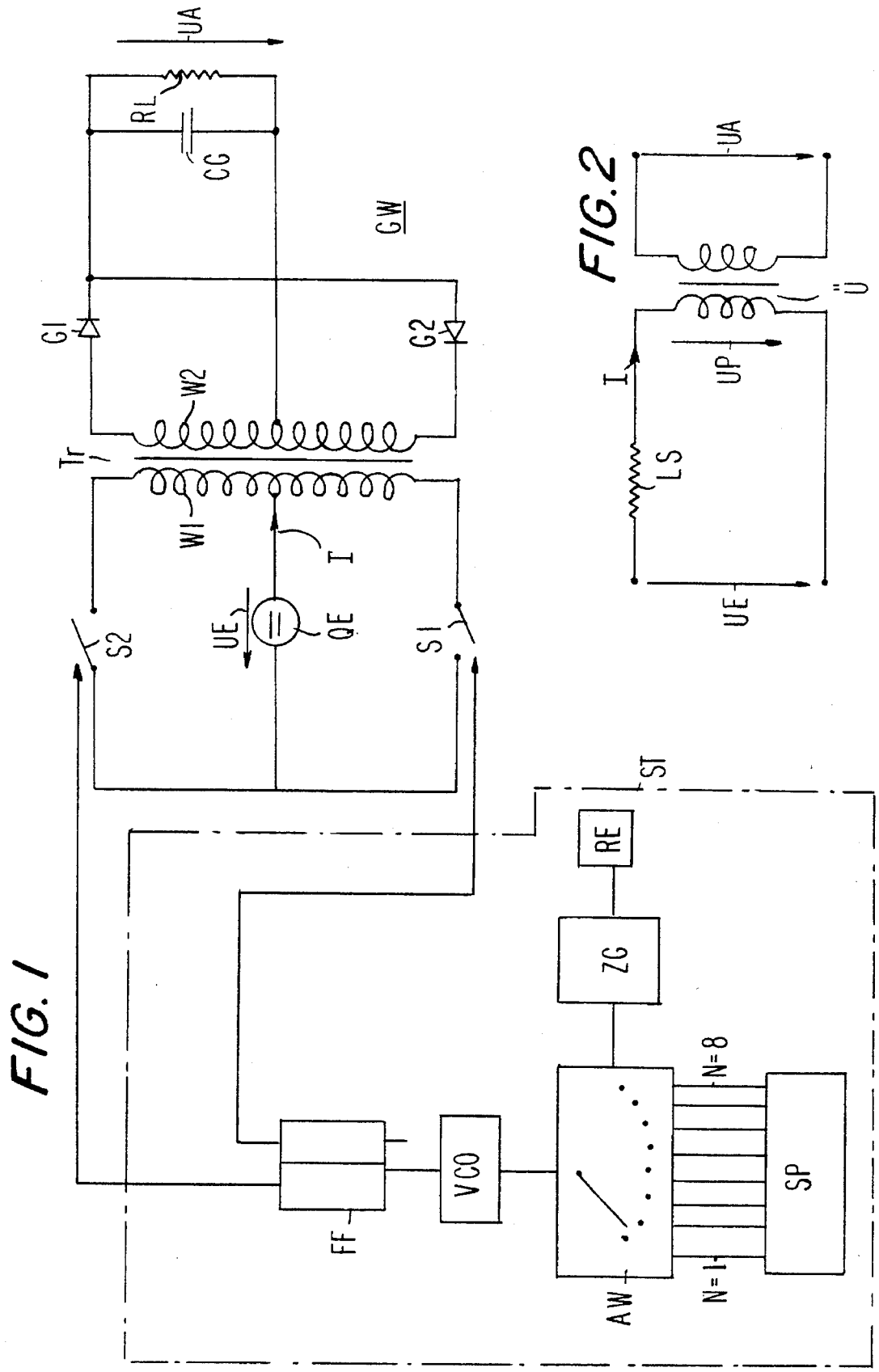

METHOD FOR OPERATING A VOLTAGE CONVERTER, AND A VOLTAGE CONVERTER AND ITS APPLICATION

The invention proceeds from a method for operating a voltage converter, in particular during a starting operation.

A method for current limitation of the input current of a voltage converter, in particular of a push-pull DC/DC converter, is disclosed in U.S. Pat. No. 5,095,416 and in the corresponding EP 0 407 691 A1. The input current is measured and integrated per operating cycle in the two push-pull branches. A control signal for a pulse-frequency modulator which determines the switching-on times of the push-pull switches of the voltage converter is derived from the integrated signal. The switching-on times of the push-pull switches are thus adjusted as a function of the measured input current, specifically in such a way that the arithmetic mean value of the push-pull converter remains constant.

WO 92/01355 discloses a switched-mode power supply in which the switching transistor is driven in such a way that during the switching-on phase its switching-on time is successively lengthened, whereas the stopping time remains constant. The switching-on phase is subdivided there into a plurality of time intervals. During the various time intervals, regulation is performed in such a way that the inrush current does not assume impermissible values.

In a similar solution in accordance with WO 85/04060, regulation is performed as a function of an error signal which leads to a change in the pulse duty factor of a pulse-modulated control signal.

Finally, JP 1283086 demonstrates a current-limiting device for a power supply unit, a definite number of time intervals being called up during the switching-on phase, using stored data. There, as well, regulation is performed as a function of an evaluated magnitude of error.

The object of the present invention is to specify a method for operating a voltage converter for switching mode, which permits energy-consuming current limitation without evaluating and regulating circuits. In addition, the aim is to demonstrate a voltage converter for carrying out this method, and applications thereof. This object is achieved by means of claim 10 with respect to the method, by means of claim 12 with respect to the voltage converter and by means of claims 15 or 16 with respect to the application. The further claims relate to embodiments of the method and of the voltage converter.

By contrast with the realization in accordance with U.S. Pat. No. 5,095,416, in the case of the invention there is no need for means for measuring the energy-consuming current or for evaluation. In the invention, the inherent inductance of the voltage converter and/or an inductor connected to the voltage converter are used for the purpose of current rise limitation. If, in particular during a starting operation of the DC/DC converter, the capacitive loads are loaded with a constant current, the output voltage will rise like a ramp. If this ramp-like rise is decomposed into a plurality of subphases, the rise in the output voltage can be approximated by means of a staircase function with a number of steps corresponding to the number of the subphases. The individual switching-on times within the corresponding subphases can now be dimensioned in such a way that the arithmetic mean value of the DC/DC converter current remains virtually constant and the inrush current does not become higher than a prescribed nominal current. In the method in accordance with U.S. Pat. No. 5,095,416, by contrast, the inrush current must be distinctly above the nominal current so that a certain control reserve is guaranteed for the limiter current, for example in the case of ageing, temperature effects, component tolerances. The method in accordance with the invention is insensitive to control fluctuations, control delays, etc. The method is suited, in particular, for satellite power supplies, for example for travelling wave amplifiers, in which no currents can be tolerated which are distinctly above a prescribed nominal current. By storing prescribed characteristic data for the switching-on times, the latter can be reproduced reliably and independently of error-prone signals.

Figure 4:
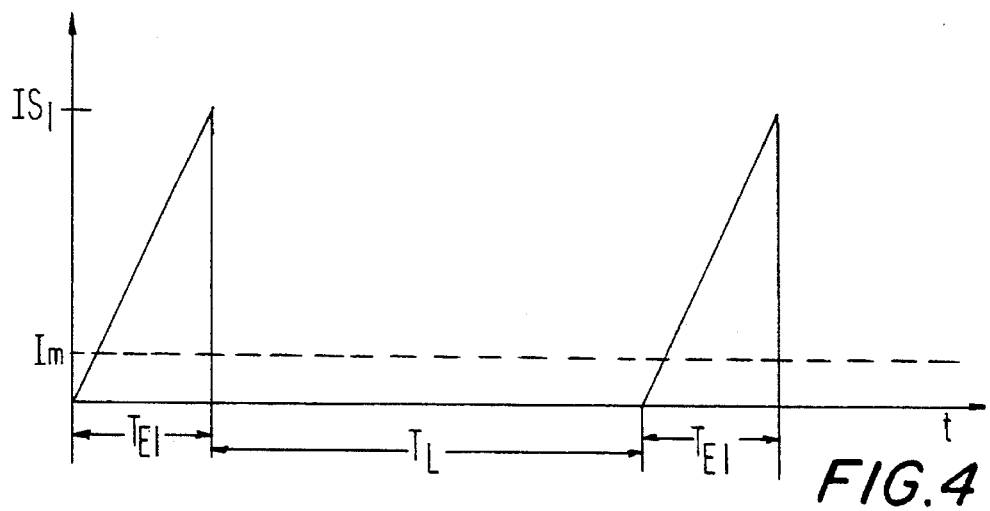
Figure 5:
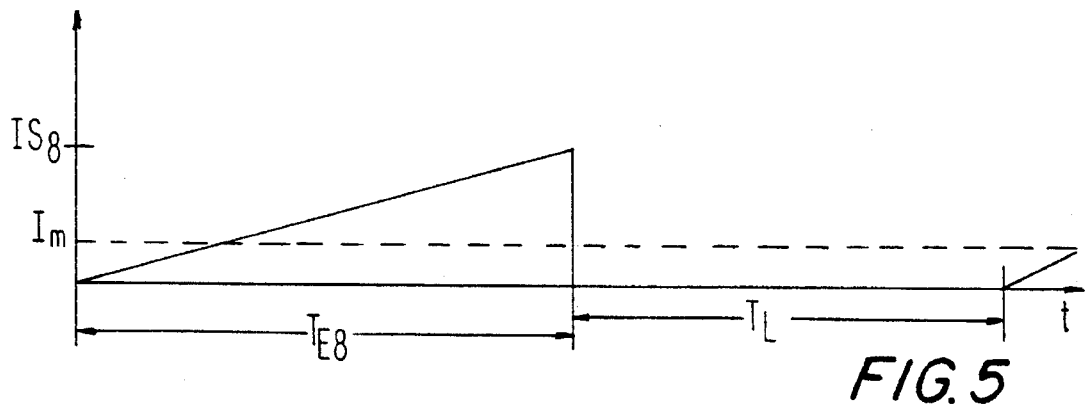
Figure 6:
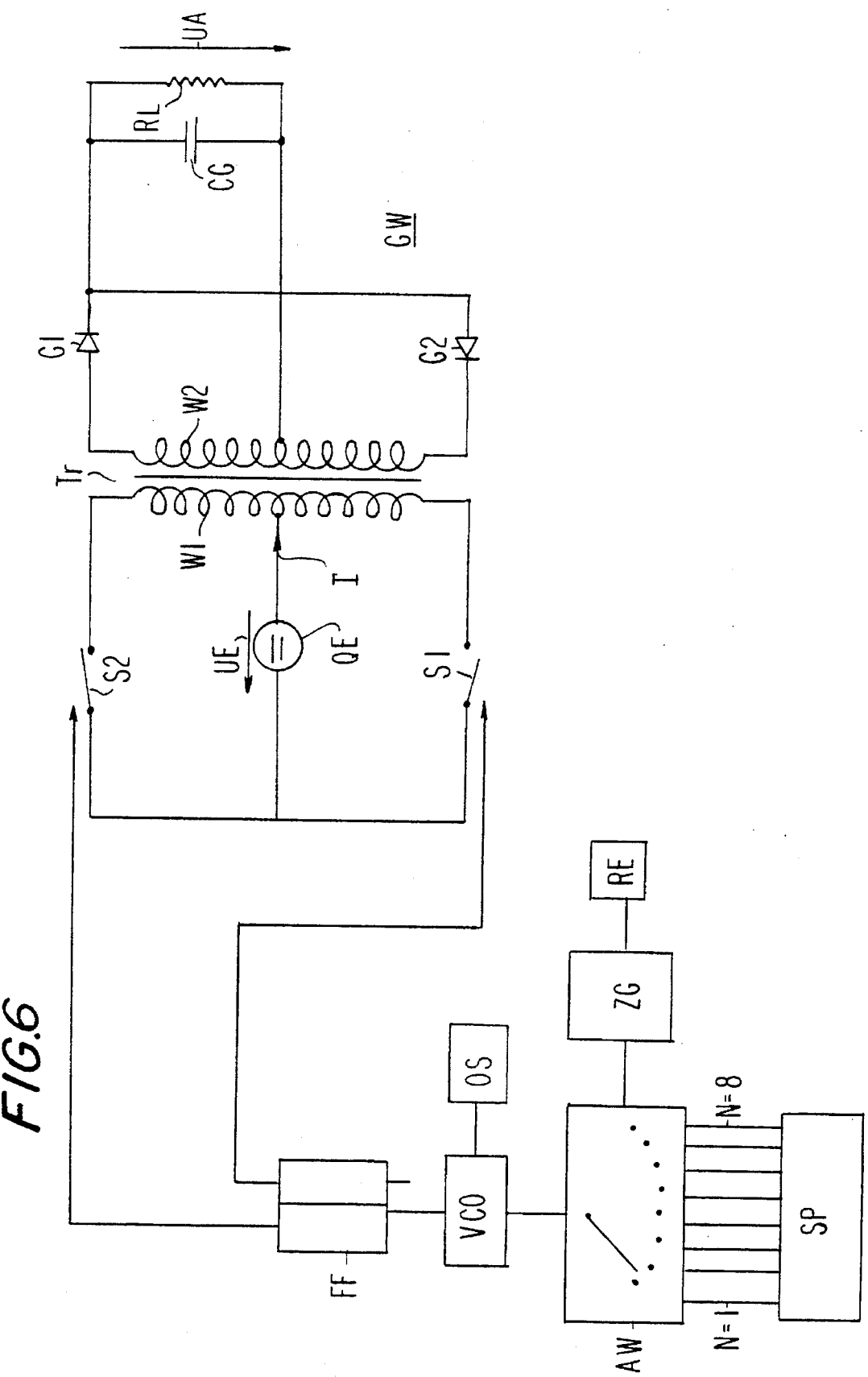
Figure 7:
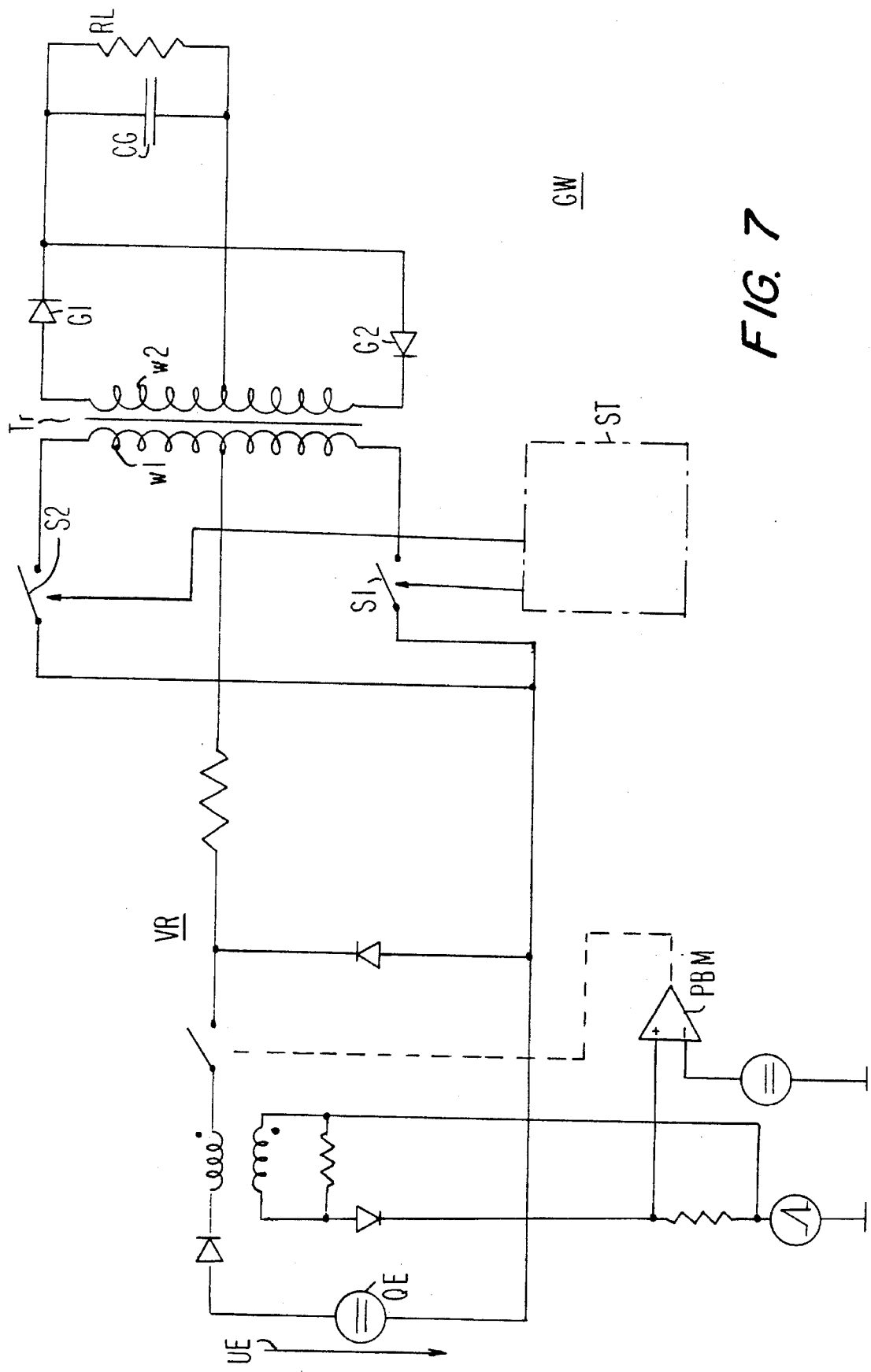

Exemplary embodiments of the invention are explained in more detail with the aid of the drawings, in which FIG. 1 shows a block diagram of a push-pull DC/DC converter, FIG. 2 shows an equivalent circuit diagram for the transformer of the push-pull DC/DC converter, FIG. 3 shows the time characteristic of the output voltage during a starting operation, FIG. 4 shows the DC/DC voltage converter current in a first subphase, FIG. 5 shows the DC/DC voltage converter current in a further subphase, FIG. 6 shows an alternative embodiment of the control of the DC/DC voltage converter, and FIG. 7 shows the operation of the DC/DC voltage converter via a preregulator.

The principle of the invention is explained below with the aid of a push-pull DC/DC voltage converter GW, which is represented in FIG. 1. The positive terminal of an input DC voltage source QE, across which an input DC voltage UE drops, is connected to the centre tap of the primary winding w1 of the transformer Tr. The negative terminal of this input DC voltage source is connected to one end of this primary winding w1 via the electronic switch S1, and to the other end of this primary winding w1 via the electronic switch S2. The secondary winding w2 is connected to push-pull rectifiers G1 and G2 and to a load RL with a smoothing capacitor CG. The transformer Tr can be represented by its equivalent circuit diagram (FIG. 2). Appearing in this equivalent circuit diagram are the leakage inductance LS of this transformer and an ideal transformer with the transformation ratio of: $UA/UP=\ddot{U}$.

The output voltage UA will increase in a ramp-like fashion upon connection of the input DC voltage source QE (FIG. 3), if the capacitive circuit elements of the DC/DC voltage converter, combined here symbolically in the smoothing capacitor CG, are loaded with a constant current I. The leakage inductance LS is used here to limit the current rise dI/dt. The current rise time TA (FIG. 3), that is to say the time phase during which the output voltage UA of the voltage converter rises linearly as a consequence of the effect of the leakage inductance LS, is now subdivided into, for example, N=8 equal subphases—time intervals. The ramp voltage during rising is now approximated by a staircase function with N=8 steps. Using this approximation and the leakage inductance LS as effective inductance LW, it is now possible to select the individual switching-on times within the corresponding 8 time intervals in such a way that the arithmetic mean value of the current I remains virtually constant and the inrush current therefore does not become higher than a prescribed nominal current. The total driving voltage drops across the leakage inductance LS in the first of the 8 time intervals.

Since UA=Ü. Up, it follows that:

$$UP = LS \cdot \frac{dI}{dt}$$

It holds for the peak value IS of the current I that:

$$IS = \frac{UP}{LS} \cdot T_{E1},$$

$T_{E1}$ being the switching-on time of the voltage converter in the first of the n subphases.

The arithmetic mean value $I_m$ of the current I per operating cycle is yielded as:

$$Im = \frac{(IS/2) \cdot T_{E1}}{T_{E1} + T_L},$$

$T_L$ representing the gap time, that is to say the time between two switching-on pulses of the voltage converter.

The relationship for IP then yields:

$$TE1 = \frac{I_m}{UP} \cdot LS \left( 1 + \sqrt{1 + \frac{2 T_L \cdot UP}{I_m \cdot LS}} \right)$$

Using the values $I_m$=6A, UP=50 V, LS=1 μH, $T_L$=3 μs, yields the result $T_{E1}$=0.97 μs.

The DC/DC voltage converter current I for this first subphase is represented in FIG. 4.

In the second subphase, only ⅞ of the driving voltage still drop across the leakage inductance. The corresponding result for the third subphase is ⅝, etc.

It holds for the nth subphase, n=1,2,3, ... N, that:

$$T_{En} = \frac{I_m \cdot LS}{UP \left( \frac{N-n+1}{N} \right)} \left( 1 + \sqrt{1 + \frac{2 T_L \cdot UP}{I_m \cdot LS} \cdot \frac{N-n+1}{N}} \right)$$

where $T_{En}$=switching-on time of the voltage converter in the nth subphase, and N=number of the subphases, for example N=8.
It holds for n that: n ∈ℕ and n≦N.

As an example, $T_{E8}$=3.5 μs is obtained using the above values. The current characteristic for this subphase N=8 is represented in FIG. 5.

The duration of the ramp, that is to say the time phase during which the output voltage of the voltage converter increases as a consequence of the inductance (here, the leakage inductance of a transformer), is a function of the output-side capacitive circuit elements, any capacitive component of the load, and the arithmetic mean value of the current which is permissible. It therefore holds for the rise time TA (FIG. 3) that $$TA \sim \frac{CG \cdot UA}{I_m},$$

the aim being to unite all the output-side capacitive components in CG. The number N of the time intervals (subphases) to be selected is a function of how precise the approximation of the staircase function to the ramp (FIG. 3) is intended to be. N=8 time intervals are sufficient for a typical high-voltage power supply of a travelling wave amplifier. With TA=8 ms and N=8, an interval time of a subphase is yielded as 1 ms.

In order to realize the method according to the invention, a control device ST is provided for the purpose of outputting the switching-on pulses. Since the exemplary embodiment in accordance with FIG. 1 concerns a push-pull DC/DC voltage converter, it is necessary to drive two switches S1 and S2. Switching-on pulses of equal length are generated for both switches within a subphase, but they are conditioned in phase opposition. The gap time $T_L$ between two pulses in phase opposition is kept constant (cf. EP 77 958 B1). A conventional pulse-frequency modulator can be used for conditioning or, in a fully digital realization, a logic unit which undertakes from a clock pulse of, for example, 5 MHz the corresponding logic operations during the rise time TA, which is determined in advance, for example in a test mode. The switching-on time $T_{En}$ is set to a higher value, calculated as previously, every millisecond, for example under the control of a clock-pulse counter.

As FIG. 1 shows, the characteristic values for the, for example, N=8 different switching-on times for the different subphases can be filed in advance in a memory SP and relayed via a selector module AW to the frequency-determining input of a frequency-controlled oscillator VCO. The selector module AW is controlled by a time generator ZG which after respectively one millisecond transfers one of the 8 characteristic values to the oscillator VCO and thus determines the switching-on times, derived in advance, for the switches S1 and S2. A flipflop FF is connected downstream of the oscillator VCO in order to condition the push-pull pulses. At the end of a rise in the output voltage UA (FIG. 3), the time generator ZG is reset via a reset device RE and thus also the selector module AW, in order to provide different switching-on times $T_{En}$ again for a renewed rise in the output voltage UA.

As an alternative to the realization in accordance with FIG. 1, the oscillator can also be constructed as a fixed-frequency oscillator OS (FIG. 6) with a frequency divider FT connected downstream whose divider ratio can be set. A separate divider ratio is then set for each characteristic value via the selector module AW.

The push-pull converter GW shown can also be operated via a preregulator VR (FIG. 7). As previously, the switching-on pulses for the switches S1 and 82 are varied only during the rise time TA. The gap time $T_L$ is kept constant. After termination of such a switching-on phase, the push-pull converter works with constant starting and stopping pulses. Regulation is undertaken only via the preregulator VR, which can be constructed as a switched-mode regulator with pulse-width modulation (PBM) or pulse-frequency modulation.

The mode of operation of such a preregulator VR is described, for example, in P 41 20 147.7.

We claim:

1. Method for operating a DC/DC converter for switching mode, in particular during a starting operation, having the following steps:

subdividing into a plurality of subphases a time phase during which the output voltage of the voltage converter increases as a consequence of at least one parameter selected from the group consisting of an inherent inductance of the voltage converter and an inductance connected to the voltage converter, the starting and stopping times are respectively selected to be constant within each subphase in which the electronic switch or switches of the DC/DC voltage converter are repeatedly switched on and off, dimensioning the switching-on times of the voltage converter from subphase with different values as a function of the effective inductance, specifically in such a way that the mean value of the energy-consuming current of the voltage converter in the subphases does not exceed a prescribed value.

2. Method according to claim 1, characterized by the following dimensioning of the switching-on times of the voltage converter in a time phase:

$$T_{en} = \frac{I_m \cdot L_w}{UP\left(\frac{N-n+1}{N}\right)} \left(1 + \sqrt{1 + \frac{2T_L \cdot UP}{I_m \cdot L_w} \cdot \frac{N-n+1}{N}}\right)$$

where N=number of the different subphases, n=running index of the subphases, n=1,2 .... N, $T_N$=switching-on time of the voltage converter in the nth subphase, $I_N$=mean value of the energy-consuming current of the voltage converter, UP=differential voltage between the input voltage of the DC/DC converter and the voltage dropping across the effective inductance $L_w$, and $T_L$=gap time; that is to say, time between two switching-on pulses of the voltage converter.

3. DC/DC voltage converter for carrying out the method according to claim 2, consisting of:

an inductive memory element (LS), at least one electronic switch (S1, S2), a control device (ST) for this/these electronic switch/switches (S1, S2) for outputting switching-on pulses for this/these electronic switch/switches, the control device (SP, AW, OS, VCO) having at least one memory (SP) available in which characteristic values for the length of the switching-on pulses of different subphases can be stored, and a selector module (AW) being provided for relaying the stored characteristic values to an oscillator (OS, VCO) via which the switching-on pulses for the electronic switch/switches (S1, S2) can be derived.

4. DC/DC voltage converter according to claim 3, characterized by a frequency-controlled oscillator (VCO) whose frequency-determining input is connected to the selector module (AW).

5. DC/DC voltage converter according to claim 3, characterized by a fixed-frequency oscillator with a frequency divider (FT) whose input determining the divider ratio is connected to the selector module (AW).

6. DC/DC voltage converter according to claim 3, characterized in that the DC/DC voltage converter is designed as a push-pull converter (GW) whose effective inductance is essentially prescribed by its transformer leakage inductance (LS) and whose gap time is selected to be constant.

7. DC/DC voltage converter according to claim 3, characterized in that the DC/DC voltage converter is designed as a push-pull converter (GW) which can be operated via a preregulator (VR), the switching-on times of the push-pull converter (GW) being selected to be of different length in subphases only during a starting operation and being switched over to a constant value after expiry of this switching-on phase.

* * * * *